(12) United States Patent
Parker et al.

(10) Patent No.: US 10,852,033 B2
(45) Date of Patent: Dec. 1, 2020

(54) HOT WATER TANK INSULATION SYSTEM AND METHOD WITH FLEXIBLE INSULATION TOP

(71) Applicant: University of Central Florida Research Foundation, Inc., Orlando, FL (US)

(72) Inventors: Danny S. Parker, Cocoa Beach, FL (US); Carlos J. Colon, Rockledge, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 0 days.

(21) Appl. No.: 16/443,456

(22) Filed: Jun. 17, 2019

(65) Prior Publication Data
US 2019/0383517 A1    Dec. 19, 2019

Related U.S. Application Data

(60) Provisional application No. 62/685,907, filed on Jun. 15, 2018.

(51) Int. Cl.
| | |
|---|---|
| F24H 1/18 | (2006.01) |
| F16L 59/02 | (2006.01) |
| F16L 59/04 | (2006.01) |
| F16L 59/08 | (2006.01) |

(52) U.S. Cl.
CPC ............ *F24H 1/182* (2013.01); *F16L 59/021* (2013.01); *F16L 59/029* (2013.01); *F16L 59/04* (2013.01); *F16L 59/08* (2013.01)

(58) Field of Classification Search
CPC ....... F16L 59/08; F16L 59/029; F16L 59/021; F16L 59/04; F24H 1/182; F24H 9/02
See application file for complete search history.

(56) References Cited

U.S. PATENT DOCUMENTS 1,484,056 A    2/1924  Birch
2,365,086 A *  12/1944 Kamowski ............. F24H 1/182
                                                            220/694.1

(Continued)

OTHER PUBLICATIONS

Expanded Polystyrene (EPS) Construction Products, Jun. 17, 2014.*
"Insulation Fiberglass Certified Satisfaction Guaranteed", www.amazon.com/Insulation-FIBERGLASS-Certified-Satisfaction-Guaranteed/dp/. Aug. 28, 2010.
"Hyper-Insulation for Water-heaters", www.johnsavesenergy.com/HyperInsulation.html#.WYom91WGOUk. Nov. 20, 2013.

(Continued)

*Primary Examiner* — Steven S Anderson, II
(74) *Attorney, Agent, or Firm* — Tiajoloff & Kelly LLP (57) ABSTRACT

An insulation system for a water heater storage tank containing water heated to a temperature higher than ambient is provided. The water heater tank has a substantially cylindrical shape and a generally circular top portion from which one or more pipes extend. A top insulation structure having two half-moon shaped insulation segments lies on the top portion insulating most of it against heat loss to the ambient environment. The insulation segments each comprise an envelope of pliable heat-resistant sheet material enclosing shapeable insulating filler material of particles. The envelopes are deformable to conformingly fit between and around pipes projecting up from the top of the water heater. An insulating jacket extends around and covers a substantial portion of a radially outwardly disposed surface of the water heater tank.

18 Claims, 5 Drawing Sheets

(56) References Cited

U.S. PATENT DOCUMENTS

| | | | | |
|---|---|---|---|---|
| 3,177,277 | A | * | 4/1965 | Adams ................ B29C 55/005 264/210.7 |
| 4,039,098 | A | * | 8/1977 | Stilts ...................... F24H 1/182 220/694.1 |
| 4,447,377 | A | | 5/1984 | Denton |
| 4,974,551 | A | * | 12/1990 | Nelson ..................... F24H 1/18 122/19.2 |
| RE33,968 | E | * | 6/1992 | Clark .................... B29C 44/184 220/592.25 |
| 8,336,495 | B1 | * | 12/2012 | Dumm ..................... A01K 9/00 119/71 |
| 2005/0127082 | A1 | * | 6/2005 | Nomula ............... B65D 51/244 220/796 |
| 2015/0093547 | A1 | * | 4/2015 | Orologio .................. B32B 3/28 428/178 |

OTHER PUBLICATIONS

David Darling, "Water Heater Tank Insulation" www.daviddarling.info/encyclopedia/W/AE water heater tank insulation.html. Aug. 18, 2006.

David Darling, "Water Heater Tank Insulation Installation", www.daviddarling.info/encyclopedia/W/AE water heater tank insulation installation.html. Nov. 7, 2007.

* cited by examiner

FIG. 9

HOT WATER TANK INSULATION SYSTEM AND METHOD WITH FLEXIBLE INSULATION TOP

RELATED APPLICATIONS

This application claims priority of U.S. provisional application Ser. No. 62/685,907 filed on Jun. 15, 2018, which is herein incorporated by reference in its entirety.

FIELD OF THE INVENTION

This invention relates to the general field of water heater storage tank insulation, such as used in buildings to provide hot water to the occupants.

BACKGROUND OF THE INVENTION

Hot water heaters hold water that is heated by some external energy source, e.g., natural gas heat, electrical energy, solar collectors, etc., for use by people, as is well known. Because the demand for hot water is intermittent, the storage-type water heaters are typically filled with heated water waiting for it to be withdrawn and used, and the heat in the hot water is lost to the ambient environment, resulting in a need for additional energy to keep the water at a proper temperature.

Insulation of standard residential storage-type water heaters has been provided to reduce the heat loss. This insulation provides some protection against heat loss, but insulation inside the tank is limited by the acceptable size of the tank preferred by homebuilders, but still allows for substantial amounts of heat escaping from the water heater tank.

Figure 1:
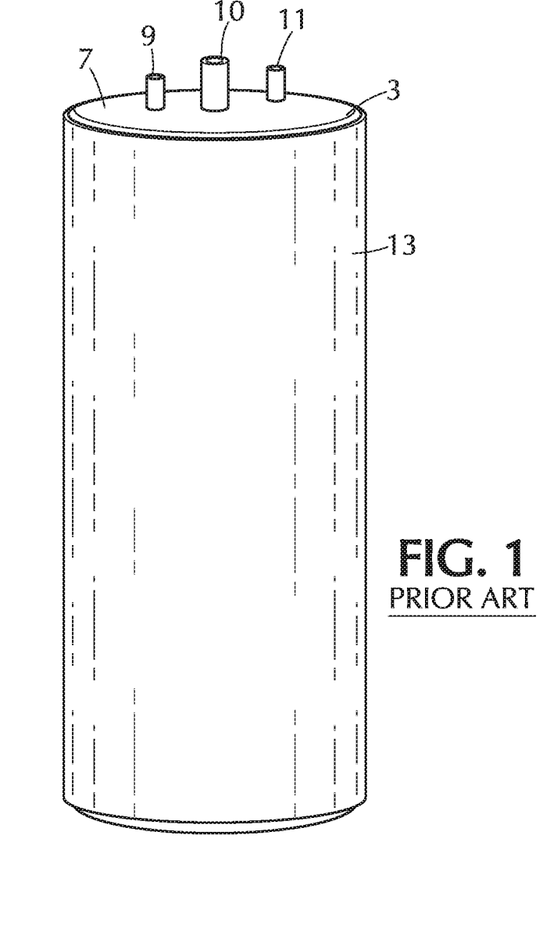
FIG. 1 is a view of a prior-art water tank insulation system.
Figure 2:
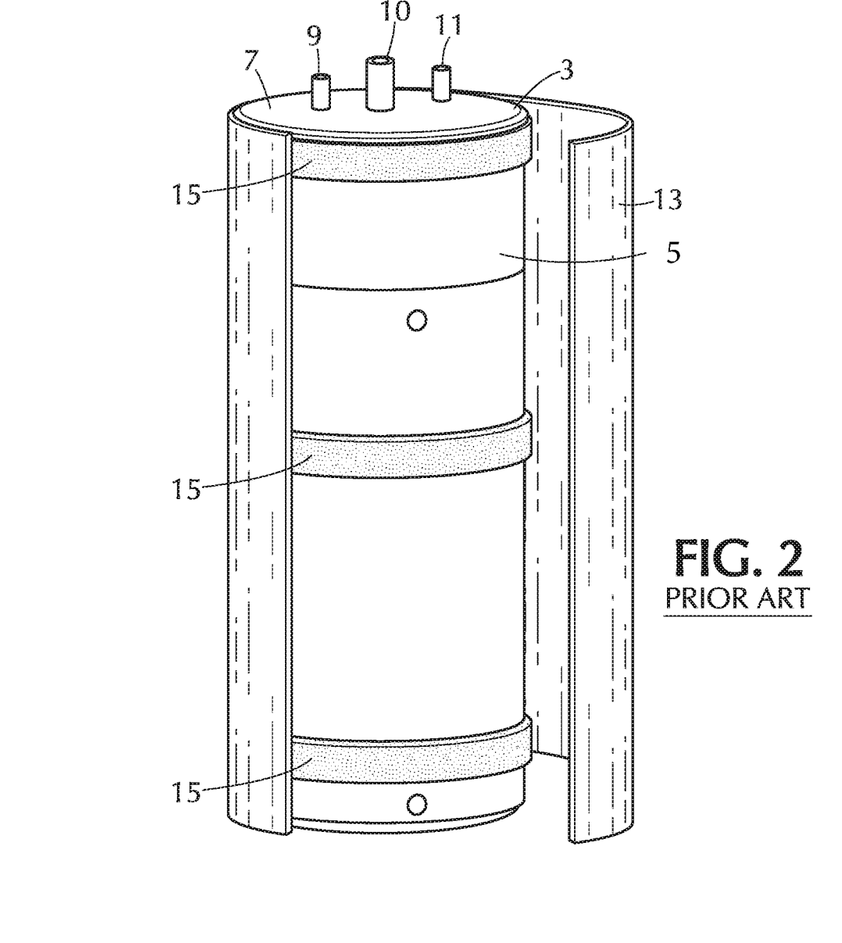
FIG. 2 is a view of the system of FIG. 1 with the outer insulation blanket partly unwrapped.

In addition, insulation has been in the form of an insulating wrap or jacket or blanket that extends around the radially-outward cylindrical exterior of the water heater tank, as is shown in FIGS. 1 and 2. Providing exterior hot water tank wraps can reduce heat loss by 7 to 16%, which rapidly provides savings in energy costs at a fairly low cost to the user. However, although, wrapping an insulating blanket around a water heater is cost-effective, the blanket insulator is limited to the radially outer wall of the heater tank, and does not cover the top of the water heater, and the top of the typical water heater can account for as much as 16.5% heat loss in summer to 26% heat loss in winter, which is a significant energy cost.

There have been insulated jackets for tanks in the prior art, such as shown in U.S. Pat. No. 1,484,056, but those jackets are specifically configured for an individual configuration of water heater with specific dimensions, making them undesirably expensive and usable only for specific water heaters, not for use with any water heater configuration.

SUMMARY OF THE INVENTION

It is therefore an object of the present invention to provide a water heater insulation that overcomes the drawbacks of the prior art.

According to an aspect of the invention, an insulated water heater storage tank comprises a water heater tank containing an amount of water heated to a temperature higher than an ambient air temperature around the tank, and the water heater tank has a substantially cylindrical shape and generally circular top portion from which at least one pipe extends. A top insulation structure comprises an insulation segment on the top portion insulating at least part of the top portion against heat loss to an ambient environment around the tank. The insulation segment comprises an envelope of pliable sheet material enclosing therein shapeable insulating filler material. The envelope has an arcuate outer edge that corresponds generally to a circle having a diameter that is about the same or greater than a diameter of the top portion of the water heater tank.

The top insulation structure preferably further comprises a second insulation segment that comprises an envelope of pliable sheet material enclosing therein shapeable insulating filler material, and the envelopes of the insulation segments each have a generally semicircular shape, with a respective inward edge that extends generally straight or slightly concavely between ends of a semicircular outer edge of the envelope. The insulation segments are arranged so as to overly at least a substantial portion of the top of the water heater tank, with the inner edges of the envelopes adjacent and contacting each other with the pipe of the water tank extending between them.

The system preferably also further includes a radially outward insulation structure, e.g., an insulating blanket, that extends circumferentially around the water heater tank and covers a substantial portion of a radially outwardly disposed surface of the tank.

According to another aspect of the invention, a top insulator configured for use on a cylindrical water heater comprises at least one half-moon shaped insulation element. The element includes an envelope of pliable heat-resistant film material that has an outer edge that is approximately half of a circle arc with a diameter of 20 to 30 inches and two opposite arc end portions, and an inner edge that extends generally straight or with a slightly middle concavity from one of the arc end portions to the other of said arc end portions. The envelope encloses and secures in it insulating fill of particles of insulating material with particle sizes of ½ inch or less, and that is sufficient in volume such that the element has an average loft of at least 1 inch.

According to still another aspect of the invention, a method of insulating a generally cylindrical hot water heater tank having a generally cylindrical radially outward surface and an upper generally circular surface from which at least one pipe extends upwardly comprises providing a jacket of insulating material extending around a substantial portion of the radially outward surface of the tank, and placing a pair of generally semicircular insulation elements overlying the upper surface of the tank on either side of the pipe. Each of the insulation elements includes an envelope of heat resistant flexible material with an outer arcuate edge and a radially inward facing edge that is straight or slightly inwardly concave. The envelope encloses particles of insulating material that provide an insulating loft to the insulation element. The placing of the insulation elements includes shaping the insulation elements so as to conformingly extend at least partially around the pipe.

According to still another aspect of the invention, a method of fabricating a top insulation system for a generally cylindrical hot water heater tank comprises forming partially-open envelopes by bonding two crescent-shaped pieces of metallized PET sheet material bonded together over a portion of their respective perimeters, filling interiors of the partially-open envelopes with insulating fill of insulating polymer-material beads with a dimension of 2 mm to 4 mm, and bonding the perimeter of the crescent-shaped pieces to each other so that the insulating polymer-material beads are too large to pass out of the interiors of the envelopes.

The hot water tank insulation system of the invention substantially reduces the heat loss of existing hot water heater tanks that use a double foil hot water tank insulation wrap for the hot water tank walls, but have the top of the tank remaining uncovered. Based on Florida Solar Energy Center (FSEC-UCF) testing a significant amount of heat is lost through the tank from the top of the tank, which has been problematic to cover.

The insulation system of the invention, in a preferred embodiment, comprises two double half-moon shaped pieces of Mylar® that are filled with insulation. The insulation can be Styrofoam beads or processed recycled Styrofoam products, which are products in search of a recycled use in society. The bag-like half-moon shapes are flexible and can fit around the varying geometry of pipe inlets, outlet and pressure relief valves. The system is extremely inexpensive, but can add up to a 20% or 30% increase in the reduced heat losses from wrapping an existing hot water tank. The low cost makes the innovation very cost effective and also flexible in terms of fitting a variety of tank top configurations.

Other objects and advantages of the invention will be apparent from this disclosure.

DETAILED DESCRIPTION

According to a preferred embodiment, the invention employs a system of half-moon flexible Mylar® bags or envelopes that are filled with insulation. They may be used in low cost, highly effective improved hot water tank insulation wrap kits. The top insulator is preferably to be sold to consumers as a component of a hot water tank insulation kit. Exemplary prior-art tank insulation kits include the Super Shield Water Heater Insulation Kits sold by U.S. Energy Products of 1211 SW 134th Ave. Miami, Fla. 33184 and the Hot Water Tank Heater Insulation Jacket DIY Premium Kit sold by JR Global Sales through www.amazon.com.

Referring to FIGS. 1 and 2, a commonly-used water heater tank 3 is generally cylindrical in shape, with a radially-outwardly exposed outer surface 5 and a circular top surface 7 from which pipes 9, 10 and 11 extend to allow intake and output of water, and may also house energy supply of electrical power connections or of possibly fuel such as natural gas or other fuel for heating the water in the tank.

The insulating system comprises a generally rectangular blanket 13 of insulating and/or reflective heat-containing foil or other material. A plurality of spacing bands 15 extend around the tank exterior 5 and create an air space surrounding the tank 3 when the blanket 13 is wrapped around the tank 3, when the blanket 13 is secured tightly around the tank 3, as seen in FIG. 1. The system achieves a reduction of heat loss by utilizing a double bubble foil insulation blanket material 13, two or more ½-inch closed cell foam rings 15, which provide airspace between the factory outer shell 5 of the tank 3 and the blanket material 13. The bubble foil material blanket 13 is metallized on both inner and outer faces to help minimize convective and radiation heat losses.

Figure 3:
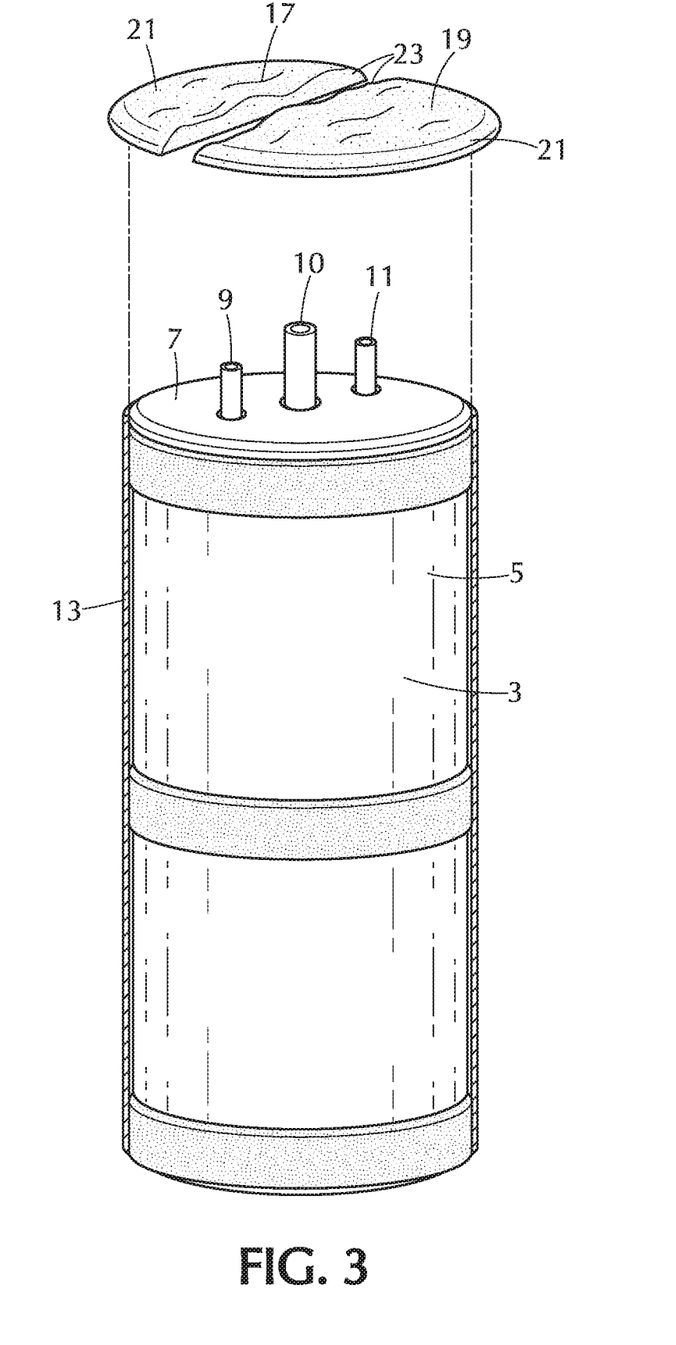
FIG. 3 is an exploded perspective view of the top insulation system of the invention.

Referring to FIG. 3, the top insulator of the invention preferably comprises two crescent or near-semicircular insulating elements or segments 17 and 19 applied to a tank 3 to which an outer insulating blanket 13 has been applied. Each segment 17, 19 has a partial-circle arcuate outer edge portion 21 with a diameter approximately that of the cylindrical water heater and a generally straight or slightly concave inward edge portion 23 near the center of the circular outer edge 21, with a flexible form that allows placement of the segments 17, 19 on a water heater 3 with pipes or valves 9, 10, 11 extending up from its upper circular end 7 or top lid.

Figure 4:
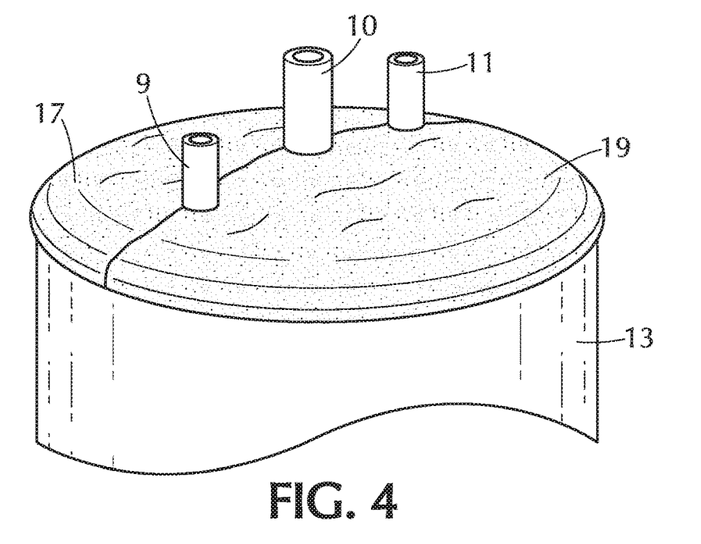
FIG. 4 is a detailed perspective view of the top of a water heater tank with the top insulator of the invention.

FIG. 4 shows a detailed perspective view of the tank 3 with the insulating segments 17 and 19 applied. The segments 17, 19 are of pliable material or fabric that each constitutes a respective envelope that supports and retains inside it a particulate or deformable insulating fill.

The insulating fill is preferably particles or pellets of polymer insulating material, such as beads of polystyrene foam or Styrofoam material. Due to the heating of the water in the tank, the top of the water heater tank may reach a relatively high temperature relative to the ambient environment, possibly as high as 180 degrees F. or 200 degrees F. Both the pliable material and the insulating fill and the construction of the segments 17, 19 are sufficiently heat-resistant in a range of temperature to which they may be exposed on top of the tank, i.e., they should be resistant to heat up to at least a temperature of 180 degrees F. to 200 degrees F. to endure the possible temperatures on the top of the water heater tank 3.

Figure 5:
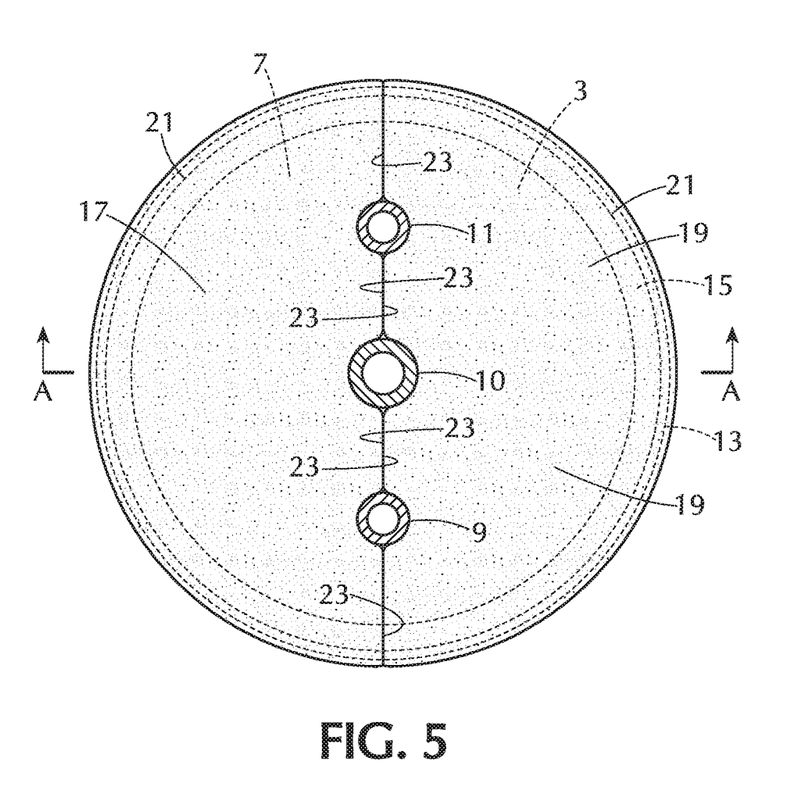
FIG. 5 is a plan view of the top insulator of the invention.

As best shown in FIG. 5, the segments 17 and 19 together overlie the top 7 to form a generally circular insulating structure. The outer arcuate edges 21 of the segments extend past the spacer ring 13 to or beyond the outer perimeter of the insulating blanket 13. Generally, a segment having a diameter of 20 to 30 inches, and preferably 23 to 27 inches is dimensioned sufficiently that the segments may be used for insulating the top of cylindrical residential-home hot water heaters with stored water volume capacities of 20 to 120 gallons of water, irrespective of the piping structure, etc., projecting from the top.

The inward edge 23 of each segment is preferably straight or, in an alternate embodiment, slightly or partly concave. Each segment is malleable and deformable, and is preferably deformed and shaped to extend generally conformingly around the pipes 9, 10, and 11 projecting up from the top of the tank. Also, the inner edge 23 of one segment 17 ideally meets the inner edge 23 of the other segment 19 in the spaces between the pipes 9, 10, and 11, and between the outer pipes 9 and 11 and the outer edge portion The deformation of the segments to fit around the pipes 9, 10, and 11 is made possible by the flexible or pliable nature of the outer envelope and the formability of the particulate insulating fill. The spacing of the pipes 9, 10 and 11 in the usual water heater tank is typically about 8 inches between adjacent pipes, so the granularity or particulate nature of the insulating fill can provides for fairly easy be molding of the segments around the pipes at installation of the segments.

Figure 6:
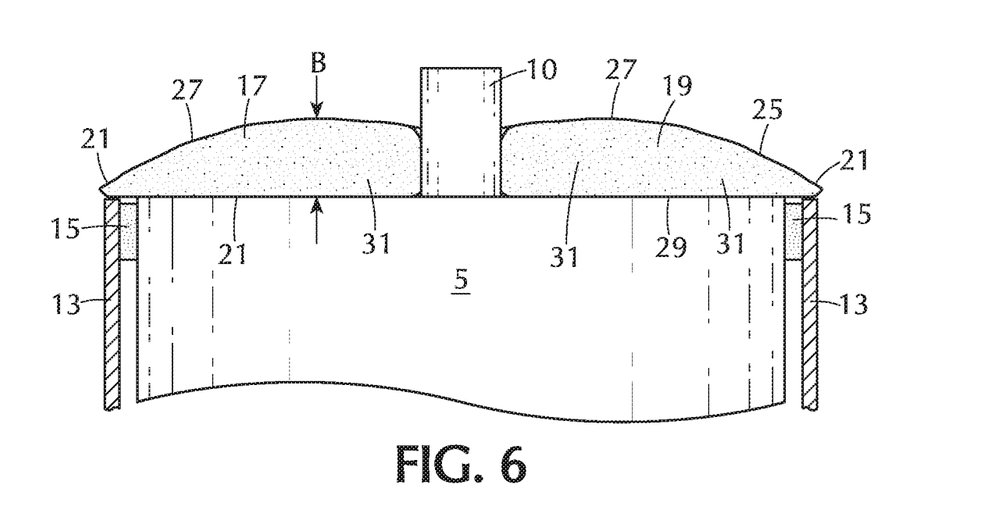
FIG. 6 is a cross-sectional view of the top insulator and tank along line A-A of FIG. 5.

Referring to FIG. 6, the cross-sectional view shows the interior of the segments 17 and 19. The outer envelope 25 of each segment 17 and 19 is made up of a generally semicircular upper part 27 and a generally semicircular lower part 29 bonded to each other about their outer perimeters to enclose the interior of the envelope 25 and so as to hold therein the particulate insulating fill 31, whatever the size and shape of the particles.

The fill 31 in the envelope 25 gives a loft to the segments 17, 19 that gives them a vertical thickness when in place that is sufficient to provide some heat retention. The loft as the term is used here means the vertical thickness of the segment, but is best understood as an average loft or average vertical thickness B over the area of the segment or over the area of the top that the segment covers if it extends beyond the edge of the top of the tank. The average loft of each segment 17, 19 over its semicircular area is between 1 and 6 inches, and preferably between 2 and 4 inches or about 2.5 inches. To the extent that the segments 17, 19 extend beyond the edge of the top of the tank, the loft may also be determined based on the coverage area over the top of the water heater tank of the elements.

The insulation fill 31 is preferably particles of heat-resistant insulating material. The particles may be any size but should be small enough to allow for the conforming shaping of the envelope around the pipes or other structures on the top 7 of the tank, e.g., as large as 0.5 inches or 10 mm, but preferably in a range of about 2 mm to 5 mm, preferably 2 mm to 4 mm. Also, as mentioned above, the particles are of material that is heat resistant to the degree that it can withstand the temperature levels that it may reach on top of the tank 3, at least up to about 180 to 200 degrees F.

Particularly preferred for fill 31 are polystyrene foam or Styrofoam beads or recycled Styrofoam, which is a household item in need of recycling uses. The beads are generally spherical or spheroidal, and preferably have a size or average dimension of about 2 to 5 mm, and most preferably 2 mm to 4 mm.

Figure 7:
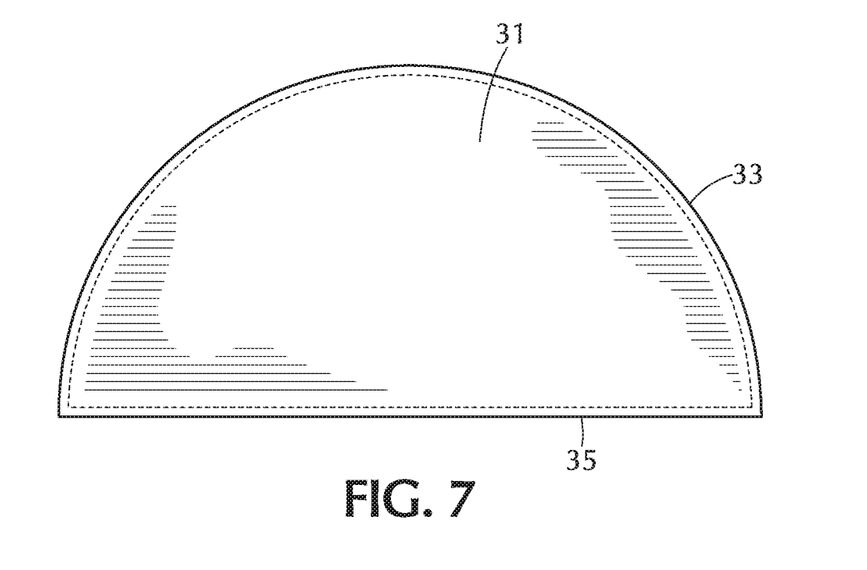
FIG. 7 is a plan view of the envelope sheet material for one of the top insulation elements.

Referring to FIG. 7, the top and bottom pieces 27 and 29 of envelope 25 itself are each a semicircular or half-moon shaped piece 31 of flexible or pliable heat-resistant sheet material with a diameter of 20 to 30 inches. Each sheet 31 has an arcuate outer edge 33 and in inner straight or possibly slightly concave inner edge 35 that form, respectively, the outer edge region 21 and the inner edge region 23 of the respective segment 17, 19, when the two pieces are bonded, fused or otherwise secured together about their perimeters.

The insulating filler material, as well as the envelope sheet material, is adequately heat resistant so as not to be affected or damaged by the temperatures to which it is exposed on the top surface of the cylindrical heater. That means that the flexible or pliable heat-resistant sheet material preferably should be heat-resistant to at least 180 or 200 degrees F.

The sheet material may be fabric or, more preferably a polymer film such as polypropylene, nylon, polyethylene or polyethylene film. Particularly preferred is metalized polyester film, especially metallized polyethylene terephthalate (PET), desirably BoPET (Biaxially-oriented polyethylene terephthalate) or Mylar®. Metallized Mylar® is used in the preferred embodiment, and it is heat resistant up to 180 or 200 degrees F., although Mylar® and the bonding that holds sheets of Mylar® together begins to possibly weaken at 250 degrees F. or higher.

The hollowed half-moon shaped sheet material is flexible and can fit around the varying geometry of pipes and pressure relief valves on top of the water heater tank. The thickness of the metalized PET material is preferably approximately 1 mil or 0.001 inches, which provides for adequate pliability to form-fit the segments around the pipes.

Metallized polyester sheet material normally has at least one layer of the polyester material to which a layer of some metallic or metal-containing material is applied by a deposition process. The metal material is often aluminum, but may also be nickel or chromium. The sheets are bonded together by thermally fusing or adhesively attaching the polyester layers to each other. Material of this sort is commonly used in novelty balloon manufacture, as is well known in the art, as is the method for making this type of balloon. The result is that the envelopes have an outer surface that is metallic, which is beneficial in its retention of heat that might otherwise be lost to the ambient environment from the tank by radiation.

For the purpose of the present invention, the envelopes are made by first providing the two half-moon pieces 31 with their polyester sides facing each other, and then bonding them together along their arcuate edges 33. The insulation fill is then inserted in the interior of the envelope, and the straight side edges 35 are then bonded together so as to seal the envelope. No gaps should remain along the edges, but if there are gaps, the gaps must be small enough to prevent egress of the insulation fill particles through them. The bonding should also be heat resistant up to at least about 180 or 200 degrees F. without delamination.

The peripheral edges of the two Mylar® sheets of the segments are secured, sealed, or fused to each other continuously around the perimeters of the segments. If any gaps in the sealing exist that create openings between the Mylar® sheets, those gaps should be small enough that the insulating filler material does not pass through the openings in the edges. The sealing process usually will result in the formation of a tab extending outwardly of the envelope around its perimeter. This tab or sealed edge is flexible and easily folds out of the way to allow the inner edges 23 to be formed around the pipes 9, 10 and 11 and to press against each other without creating a space between the edges 23 of the envelopes 17 and 19.

The outer surfaces of the segments are generally the metallic or metal-containing layer, which avoids radiant heat loss and adds to the containment of heat in the tank.

The resulting system is extremely inexpensive, but can add up to a 30% increase in the reduced heat losses from wrapping an existing hot water tank. Given the superior performance, such an innovative tank wrap system can become and attractive retrofit measure for electric utilities in need of inexpensive options for its customers interested in energy savings.

This is a very low cost insulation top structure. The Mylar® bag or envelope is commonly available at a low cost, and the Styrofoam bead insulation material can be made from recycled expanded polystyrene, which otherwise has few uses in society. The shapeable envelope design is a more flexible, better insulating top system that is adaptable in that piping and pressure relief valves can be easily fit around and accommodated by the half-moon shape of the flexible Mylar® insulation segments, which can be made without especially high tolerances to fits specific pipe arrangements or tank dimensions.

Figure 8:
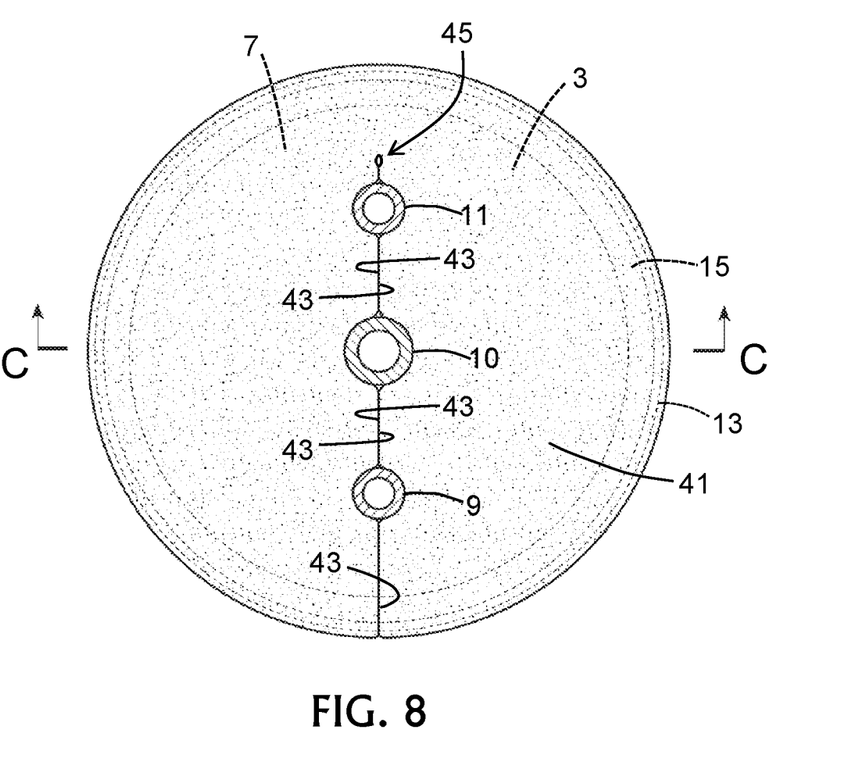
FIG. 8 is plan view of an alternate embodiment of top insulator according to the invention.

FIG. 8 shows an alternate embodiment of top insulation arrangement. In this embodiment, the top insulator is a single insulation element 41. Instead of being in two separate segments 17 and 19 as in the earlier embodiment, insulator 41 is a circular element with about 360 degrees of the circumference of a circle for its outer edge. Straight inward edges 43 extend inwardly at one point to provide a slot in the element 41 that is placed on the pipes 9, 10 and 11. The slot does not extend the full diameter of the element 41, but instead extends only to an end point 45 not completely across the element 41.

The element 41 is of the same materials as elements 17 and 19 above. Specifically, the element has an outer envelope of metallized film, as described above, and the insulating fill is as described previously. Preferably the sheet material of the envelope of element 41 is aluminum-metallized Mylar® as described above, and the insulating filler is Styrofoam beads with sizes of 2 mm to 5 mm or 2 mm to 4 mm. The element 41 is very similar to that of the earlier embodiment, except for the connection of the two segments outward of slot end point 45. Apart from that, the insulation structures are essentially the same, and the cross section taken at line C-C of FIG. 8 is the same view as the cross section taken at line A-A of FIG. 5.

Figure 9:
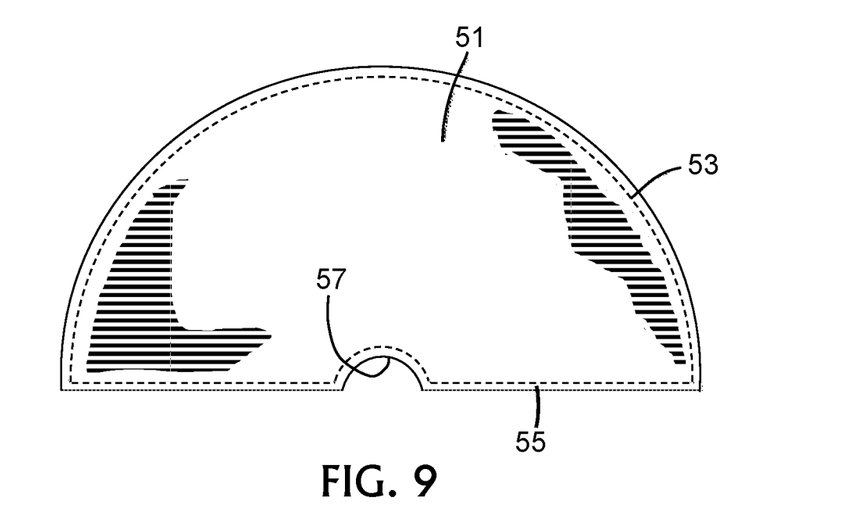
FIG. 9 is a plan view of the envelope sheet material for an alternate embodiment of the top insulation element.

FIG. 9 illustrates still another embodiment by its constituent envelope sheets 51. The sheets 51 are the same as the sheets of the first embodiment in terms of the sheet material used, and they are bonded together along the arcuate portions 53, filled with insulation material, and then completely sealed along the inward edge 55.

The sole difference in this embodiment is that the inward edge is provided with one or more recesses 57 configured to partially fit around a pipe projecting up from the center of the tank top. Similar recesses may also be provided for other pipes, although, as mentioned above, there may be variants of the placement and number of pipes in different hot water heater tanks.

COMPARATIVE EXAMPLES

A comparative test was conducted for the present invention relative to previous configurations. Specifically, the baseline or pre-existing water heater was tested with the same water heater insulated with only the insulating blanket or jacket, and with the same water heater with the insulating blanket as well as a top insulation structure according to the invention and as shown above.

The three different configurations were tested for their data from an experimental period (July-February) that was segmented into three sections to examine performance representing Summer, Fall and Winter, as seasonal temperatures are known to change. Testing was performed on a standard 50-gallon water heater with thermostat setting (125 F) drawing hot water totaling 54 gallons per day (average). The averaged coefficient of performance (COP), ambient temperatures, standby losses (Whrs/day) and percent change relative to the insulation activity studied (i.e., baseline water heater as is, jacket only added, and Jacket+top insulator applied) are shown in the table below.

The data indicates the level of change in performance per level of insulation component applied. The segmented data also conclusively shows that the top insulation in the combined system provides superior heat loss reductions and savings to that of a system without the top insulation structure of the insulating segments 17 and 19 described above.

TABLE 1

| Summer (Jul. 1-Aug. 16, 2007) | | | |
|---|---|---|---|
| | COP | Average Ambient Temp (F.) | Standby Loss (Whrs/day) | Standby Loss % change |
| Baseline | 0.851 | 86.6 | 848.6 | — |
| Jacket Only | 0.868 | 83.7 | 774.5 | −8.73% |
| Jacket and Top Insulation | 0.887 | 85.5 | 634.4 | −25.2% |

| | COP | Average Ambient Temp (F.) | Standby Loss (Whrs/day) | Standby % change |
|---|---|---|---|---|
| Fall (Oct. 13-Dec. 10, 2017) | | | | |
| Baseline | 0.847 | 74.5 | 1093.4 | — |
| Jacket Only | 0.850 | 74.1 | 1095.1 | +0.15% |
| Jacket and Top Insulation | 0.876 | 68.6 | 986.6 | −9.77% |
| Winter (Jan. 2-Feb. 19, 2018) | | | | |
| Baseline | 0.845 | 64.4 | 1355.6 | — |
| Jacket Only | 0.862 | 52.7 | 1392.9 | +2.7% |
| Jacket and Top Insulation | 0.870 | 60.1 | 1036.5 | −23.9 |

A consistent level of increased performance (i.e., less standby losses) is shown for the summer period as each piece of the insulation kit system is applied (i.e., jacket only and both jacket and top insulation). In summer, a reduction on standby losses of 8.7% was achieved with the jacket only, and a reduction on standby losses of 25.2% was achieved with the top structure insulation kit including both the jacket and the top insulation of the invention.

A similar sequence reduction in standby losses was not observed for the Fall and Winter data cases of the jacket-only system, but high percentages of heat loss reduction were observed on all seasonal cases when using the combined jacket and top insulation system according to the invention, which represented a substantial improvement over a jacket-only insulation system. This data seems to support the conclusion that the top plate of the tank—which most insulation kits neglect—may be the most important surface area to insulate in a water heater tank to improve heat-loss reduction. The current invention addresses that deficiency of the prior art with a top insulation system that is economical and adaptable to fit virtually any water heater of the sort that store 20 to 120 gallons of heated water.

The terms herein should be read as terms of description not limitation, as those of skill in the art with this disclosure before them will be able to make changes and modifications therein without departing from the spirit of the invention.

What is claimed is:

1. An insulated water heater storage tank system comprising:
   a water heater tank containing an amount of water heated to a temperature higher than an ambient air temperature around the water heater tank;
   said water heater storage tank having a cylindrical shape and circular top portion from which at least one pipe extends; and
   a top insulation structure comprising an insulation segment on the top portion insulating at least part of the top portion against heat loss to an ambient environment around the water heater tank;
   the insulation segment comprising an envelope of pliable sheet material enclosing therein shapeable insulating filler material; and the envelope having an arcuate outer edge having a diameter that is the same or greater than a diameter of the top portion of the water heater tank;

wherein the insulating filler material comprises particles of heat resistant polymer insulating material that have an average size no greater than ½ inch; and wherein the top insulation structure provides an average loft that is from 1 to 4 inches over the area of the top of the water tank heater; and the envelope having an inward edge facing the pipe and extending straight over the entire length thereof;

wherein the envelope can be deformed to conformingly engage and extend partially around the pipe extending from the top portion of the water heater.

2. The insulated water heater storage tank system according to claim 1, and the top insulation structure further comprising a second insulation segment that comprises a second envelope of pliable sheet material enclosing therein shapeable insulating filler material;

the envelopes of the insulation segments each having a semicircular shape, the envelope of the second insulation segment having with a respective inward edge that extends straight between ends of a semicircular outer edge of said envelope; and said insulation segments being arranged so as to overly at least a substantial portion of the top of the water heater tank, with the inner edges of the envelopes adjacent and contacting each other with the pipe of the water tank extending therebetween.

3. The insulated water heater storage tank system according to claim 1, and a radially outward insulating blanket that extends circumferentially around the water heater tank and covers a substantial portion of a radially outwardly disposed surface of the tank.

4. The insulated water heater storage tank system according to claim 1, wherein the top insulation structure provides an average loft of 2.5 inches over the area of the top of the water tank heater.

5. The insulated water heater storage tank system according to claim 1, wherein the arcuate outer edge of the envelope extends around the cylindrical shape of the tank, and the envelope defines a slot extending across the envelope, the pipe extending through said slot.

6. The insulated water heater storage tank system according to claim 1, wherein the pliable sheet material and insulating fill material are heat resistant up to at least 180 degrees F.

7. The insulated water heater storage tank system according to claim 1, wherein the pliable sheet material is a metallized polymer film selected from the group consisting of polypropylene, nylon, polyethylene and polyethylene films, and having a metallic surface exposed outwardly of the envelope.

8. The insulated water heater storage tank system according to claim 1, wherein the pliable sheet material is metallized polyethylene terephthalate (PET).

9. The insulated water heater storage tank system according to claim 1, wherein the insulating fill material is particles of polystyrene foam having a size of 2 to 5 mm.

10. The insulated water heater storage tank system according to claim 1, wherein the diameter of the arcuate portion is 20 to 30 inches.

11. A top insulator configured for use on a cylindrical water heater having a circular top, said insulator comprising:

at least one half-moon shaped insulation element, said element including an envelope of pliable heat-resistant film material that has an outer edge that is half of a circle arc having a diameter of 20 to 30 inches and having two opposite arc end portions, and an inner edge that extends straight over the entire distance from one of the arc end portions to the other of said arc end portions; and said envelope enclosing and securing therein insulating fill of particles of insulating material that is heat resistant up to a temperature of at least 180 degrees F., said particles having particle sizes of ½ inch or less, and being sufficient in volume such that the element has a loft of at least 1 inch over a semicircular area thereof;

wherein the envelope can be deformed to conformingly engage and extend partially around a pipe extending upward from the top of the water heater.

12. The top insulator of claim 11, wherein the film material is metallized polyethylene terephthalate (PET) with the envelope having an outwardly disposed metal surface, said material being heat resistant up to a temperature of at least 180 degrees F.

13. The top insulator of claim 12, wherein the insulating material is polystyrene foam beads having a size of 2 mm to 5 mm.

14. The top insulator of claim 12, wherein the loft is between 2 and 4 inches.

15. A method of insulating a generally cylindrical hot water heater tank having a cylindrical radially outward surface and an upper circular surface from which at least one pipe extends upwardly, said method comprising:

providing a jacket of insulating material extending around a substantial portion of the radially outward surface of the hot water heater tank; and placing a pair of generally semicircular insulation elements overlying the upper surface of the hot water heater tank on either side of said pipe, each of the insulation elements including an envelope of heat resistant flexible material with an outer arcuate edge and a radially inward facing edge that is straight over the entire length thereof, said envelope enclosing particles of insulating material that is heat-resistant up to at least 180 degrees F., wherein said particles provide an insulating loft to the insulation element;

said placing of the insulation elements including shaping the particles of heat-resistant insulating material inside the insulation elements so as to shape the insulation elements to conformingly extend at least partially around said pipe.

16. The method of claim 15, wherein the heat resistant flexible material of the envelopes is metallized polymer film and the particles of insulating material are heat resistant polymer insulating material that have an average size no greater than ½ inch, and the heat resistant flexible material and the heat resistant polymer insulating material are heat resistant up to at least 200 degrees F.

17. The method of claim 16, wherein the heat resistant flexible material of the envelopes is metallized biaxially-oriented polyethylene terephthalate film and the particles of insulating material are of polystyrene insulating material and of sizes of 2 mm to 5 mm.

18. A method of claim 15, wherein the method further comprises fabricating the envelopes by a process comprising:

forming partially-open envelopes by bonding two crescent-shaped pieces of metallized PET sheet material bonded together over a portion of a respective perimeter thereof;

filling interiors of the partially-open envelopes with insulating fill of insulating plastic-material beads with a dimension of 2 mm to 4 mm; and bonding the perimeter of the crescent-shaped pieces to each other so that the insulating plastic-material beads are too large to pass out of the interiors of the envelopes.

\* \* \* \* \*